(12) United States Patent
Phifer

(10) Patent No.: US 11,046,455 B2
(45) Date of Patent: Jun. 29, 2021

(54) ANTI-COLLISION LIGHT ASSEMBLY

(71) Applicant: B/E AEROSPACE, INC., Winston Salem, NC (US)

(72) Inventor: Van Phifer, Greendale, WI (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 16/661,612

(22) Filed: Oct. 23, 2019

(65) Prior Publication Data
US 2021/0122493 A1    Apr. 29, 2021

(51) Int. Cl.
| | | |
|---|---|---|
| *B64D 47/06* | (2006.01) | |
| *F21S 43/31* | (2018.01) | |
| *F21S 43/37* | (2018.01) | |
| *F21S 43/14* | (2018.01) | |
| *F21Y 115/10* | (2016.01) | |
| *F21Y 105/18* | (2016.01) | |
| *F21W 103/10* | (2018.01) | |
| *F21W 107/30* | (2018.01) | |

(52) U.S. Cl.
CPC ............. *B64D 47/06* (2013.01); *F21S 43/14* (2018.01); *F21S 43/31* (2018.01); *F21S 43/37* (2018.01); *F21W 2103/10* (2018.01); *F21W 2107/30* (2018.01); *F21Y 2105/18* (2016.08); *F21Y 2115/10* (2016.08)

(58) Field of Classification Search
CPC . B64D 47/06; F21S 43/14; F21S 43/37; F21S 43/31; F21Y 2105/18; F21Y 2115/10; F21W 2103/10; F21W 2107/30
See application file for complete search history.

(56) References Cited

U.S. PATENT DOCUMENTS

| 4,512,681 | A | 4/1985 | Hayhurst | |
| 7,236,105 | B2 * | 6/2007 | Brenner | B64D 47/06 |
| | | | | 340/981 |
| 7,645,053 | B2 | 1/2010 | Machi et al. | |
| 9,995,453 | B2 * | 6/2018 | Kang | F21K 9/232 |

(Continued)

FOREIGN PATENT DOCUMENTS

| EP | 1731423 | 12/2006 |
| EP | 2924340 | 9/2015 |

(Continued)

OTHER PUBLICATIONS

European Patent Office, European Search Report dated Jan. 28, 2021 in Application No. 20190648.4.

*Primary Examiner* — Rajarshi Chakraborty
*Assistant Examiner* — Glenn D Zimmerman
(74) *Attorney, Agent, or Firm* — Snell & Wilmer L.L.P.

(57) ABSTRACT

A light assembly includes a base, an annular reflector, and a retainer. The base includes one or more light sources mounted thereto. The annular reflector comprises a first radially outward surface and a first radially inward surface. The annular reflector also defines a central longitudinal axis, with the first radially outward surface including a reflective surface. The retainer is coupled to the base and comprises a second radially outward surface. The second radially outward surface of the retainer seats against the first radially inward surface of the annular reflector to retain the annular reflector in a desired position relative to the light source mounted to the base, according to various embodiments.

16 Claims, 5 Drawing Sheets

(56) References Cited

U.S. PATENT DOCUMENTS

| | | | |
|---|---|---|---|
| 10,124,910 B2 | 11/2018 | Wise | |
| 10,150,575 B2 | 12/2018 | Franich | |
| 2006/0077071 A1* | 4/2006 | Brenner | B64D 47/06 340/961 |
| 2010/0123397 A1* | 5/2010 | Tian | B64F 1/20 315/113 |
| 2011/0121734 A1 | 5/2011 | Pape | |
| 2015/0211692 A1* | 7/2015 | Kang | F21V 7/09 362/235 |
| 2017/0002999 A1* | 1/2017 | Johnson | F21V 7/04 |
| 2019/0144131 A1 | 5/2019 | Jha | |

FOREIGN PATENT DOCUMENTS

| | | |
|---|---|---|
| EP | 3476745 | 5/2019 |
| FR | 2967234 | 5/2012 |
| WO | 2009084049 | 7/2009 |

\* cited by examiner

ANTI-COLLISION LIGHT ASSEMBLY

FIELD

The present disclosure relates to light assemblies, and more specifically anti-collision light assemblies for vehicles.

BACKGROUND

Vehicles often use high-intensity anti-collision lights to alert nearby observers of the vehicle's presence in order to reduce the likelihood of a collision. In the context of aviation, specific regulations define light intensity requirements. For example, according to Federal Aviation Administration ("FAA") regulation codified at 14 C.F.R. 25.1401, aircraft anti-collision lights benefit from directing light 360° about a horizontal plane. Such anti-collision lights improve the visibility of aircraft, thereby allowing air traffic controllers and other aircraft to visually identify and orient the aircraft.

Conventional anti-collision light assemblies generally include one or more reflectors that redirect light to meet the visibility standards of regulating entities such as the FAA. However, due to various manufacturing and installation factors, the reflective surface(s) of conventional light assemblies may have distortions or may be improperly aligned relative to light sources, and thus the pattern of emitted light may be adversely affected.

SUMMARY

In various embodiments, the present disclosure provides a light assembly that includes a base, an annular reflector, and a retainer. The base includes one or more light sources mounted thereto. The annular reflector comprises a first radially outward surface and a first radially inward surface. The annular reflector also defines a central longitudinal axis, with the first radially outward surface including a reflective surface. The retainer is coupled to the base and comprises a second radially outward surface. The second radially outward surface of the retainer seats against the first radially inward surface of the annular reflector to retain the annular reflector in a desired position relative to the light source mounted to the base.

In various embodiments, the annular reflector comprises a first end rim disposed toward the base and a second end rim extending away from the base. The first end rim may have a first radius and the second end rim may have a second radius, with the second radius being larger than the first radius. The reflective surface of the annular reflector may be concave from the first end rim to the second end rim. In various embodiments, the reflective surface of the annular reflector is parabolic from the first end rim to the second end rim. The axis of symmetry of the parabolic reflective surface may be perpendicular to the central longitudinal axis of the annular reflector.

In various embodiments, a seated interface of the light assembly is defined as a region of direct contact between the second radially outward surface of the retainer and the first radially inward surface of the annular reflector. The reflective surface of the annular reflector and the seated interface have a same profile, according to various embodiments. In various embodiments, a wall thickness of the annular reflector between the seated interface and the reflective surface is constant. In response to coupling the retainer to the base, the annular reflector is compressed between the second radially outward surface of the retainer and the base. That is, in the installed/assembled configuration, the annular reflector is compressed between the second radially outward surface of the retainer and the base, according to various embodiments. The annular reflector may be exclusively retained to the base via the seated interface between the annular reflector and the retainer.

In various embodiments, the light source is a first light source of a plurality of light sources. The plurality of lights sources may be circumferentially distributed around the annular reflector (e.g., the plurality of light sources may be concentric with the annular reflector). Also disclosed herein, according to various embodiments, is an anti-collision light assembly of an aircraft. The anti-collision light assembly may comprise the features discussed above.

Also disclosed herein, according to various embodiments, is a method of assembling a light assembly. The method may include positioning an annular reflector adjacent a base, wherein the base comprises a plurality of light sources. The method may also include inserting a retainer into a central bore defined by the annular reflector. Further, the method may include coupling the retainer to the base such that a radially outward surface of the retainer engages a radially inward surface of the annular reflector to retain the annular reflector in a desired position relative to the plurality of light sources.

In various embodiments, the radially outward surface of the retainer and the radially inward surface of the annular reflector have a same profile. In such embodiments, in response to coupling the retainer to the base, a seated interface of the light assembly is defined as a region of direct contact between the radially outward surface of the retainer and the radially inward surface of the annular reflector. In various embodiments, a wall thickness of the annular reflector along the seated interface is constant.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 0.1B illustrates a front profile view of an aircraft having multiple anti-collision lights, in accordance with various embodiments;

Figure 1A:
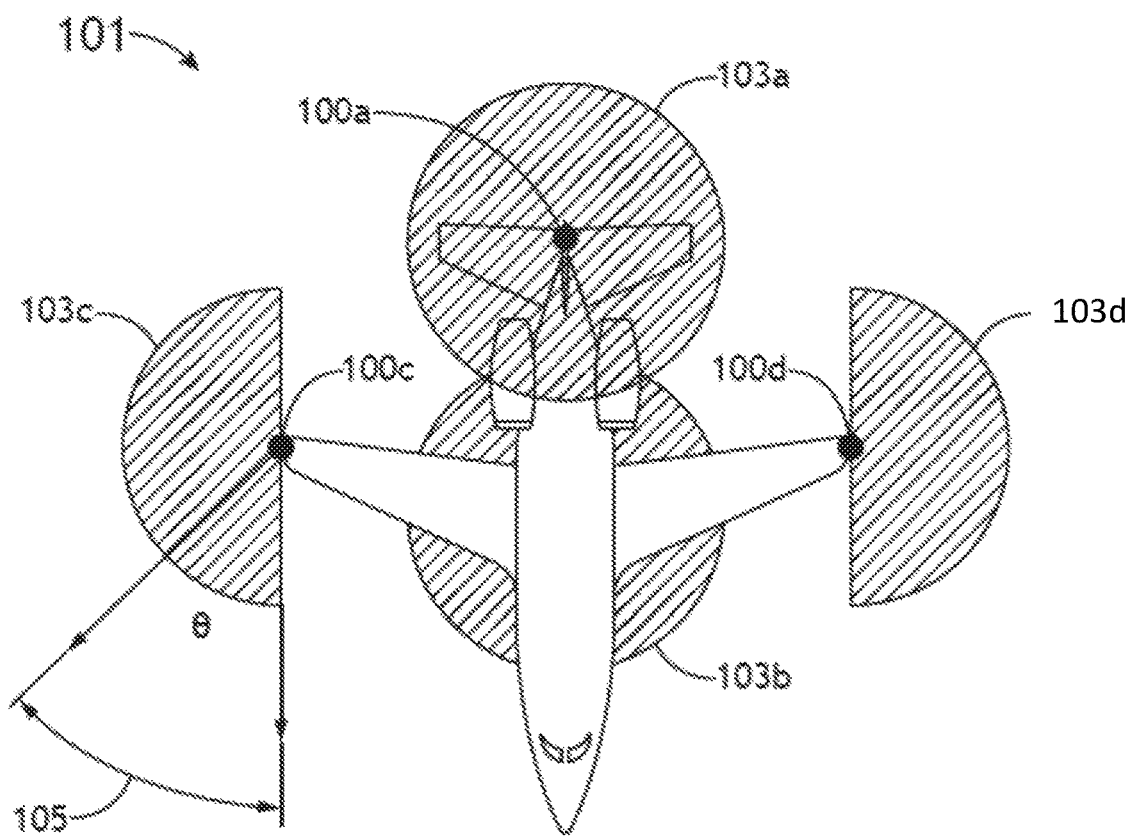
FIG. 1A illustrates a top view of an aircraft having multiple anti-collision lights, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Figure 1B:
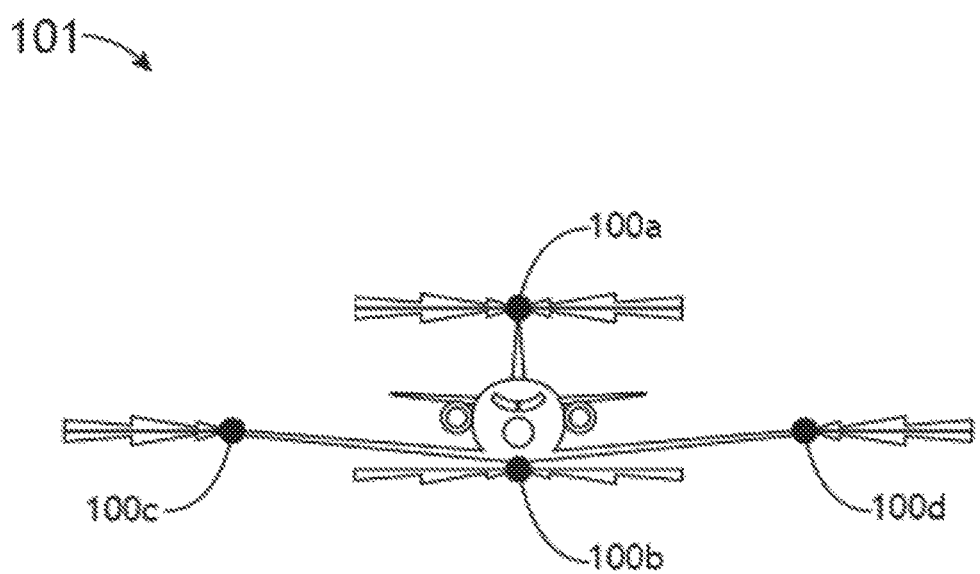

As stated above, vehicles often use high-intensity anti-collision lights to alert nearby observers of the vehicle's presence in order to reduce the likelihood of a collision. In the context of aviation, specific regulations define light intensity requirements. For example, according to Federal Aviation Administration (FAA) regulation codified at 14 C.F.R. 25.1401, aircraft anti-collision lights benefit from directing light 360° about a horizontal plane. FIG. 1A illustrates a top view of an aircraft 101 including multiple anti-collision lights 100, in accordance with various embodiments. FIG. 1B illustrates a front profile view of an aircraft 101 including multiple anti-collision lights 100, in accordance with various embodiments. For example, aircraft 101 may include a first anti-collision light 100a disposed on the tail of the aircraft 101, a second anti-collision light 100b disposed on a lower surface of a fuselage of the aircraft 101, and third and fourth anti-collision lights 100c, 100d disposed on the wings of the aircraft 101. It is noted herein that additional and/or alternative anti-collision lights 100 may be used without departing from the spirit or scope of the present disclosure. For example, aircraft 101 may include an anti-collision light 100 disposed on an upper surface of the fuselage of the aircraft 101.

In various embodiments, the one or more anti-collision lights 100 are configured to emit light across an illumination field of view 103 (e.g., an emitted light pattern). An illumination field of view 103 (e.g., 103a, 103b, 103c, 103d) may be defined as a plurality of horizontal and vertical angles through which an anti-collision light 100 emits illumination. In this regard, an illumination field of view 103 may be defined by a lateral angle (θ) 105. For example, as shown in FIGS. 1A-1B anti-collision light 100c may be configured to emit light across an illumination field of view 103c. By way of another example, anti-collision light 100a may be configured to emit light across an illumination field of view 103a, wherein the illumination field of view 103a is defined by a 360° lateral angle 105. In various embodiments, lights configured to provide illumination for a single hemisphere (e.g., upper hemisphere, lower hemisphere).

It is contemplated herein that the anti-collision lights 100 of the present disclosure may be utilized by any aircraft known in the art including, but not limited to, jet aircraft, commercial aircraft, military aircraft, and the like. While numerous details are included herein pertaining to implementing and using the anti-collision light assembly with aircraft, the scope of this disclosure is not necessarily limited to aircraft. For example, the light assemblies disclosed herein may be implemented on other airborne vehicles (e.g., helicopters), land-based vehicles (e.g., automobiles, motorcycles, military vehicles), aquatic vehicles (e.g., passenger boats, commercial ships, etc.), and the like. Further, the light assemblies disclosed herein may be used as beacons or other light emitters for structures and buildings.

Figure 2:
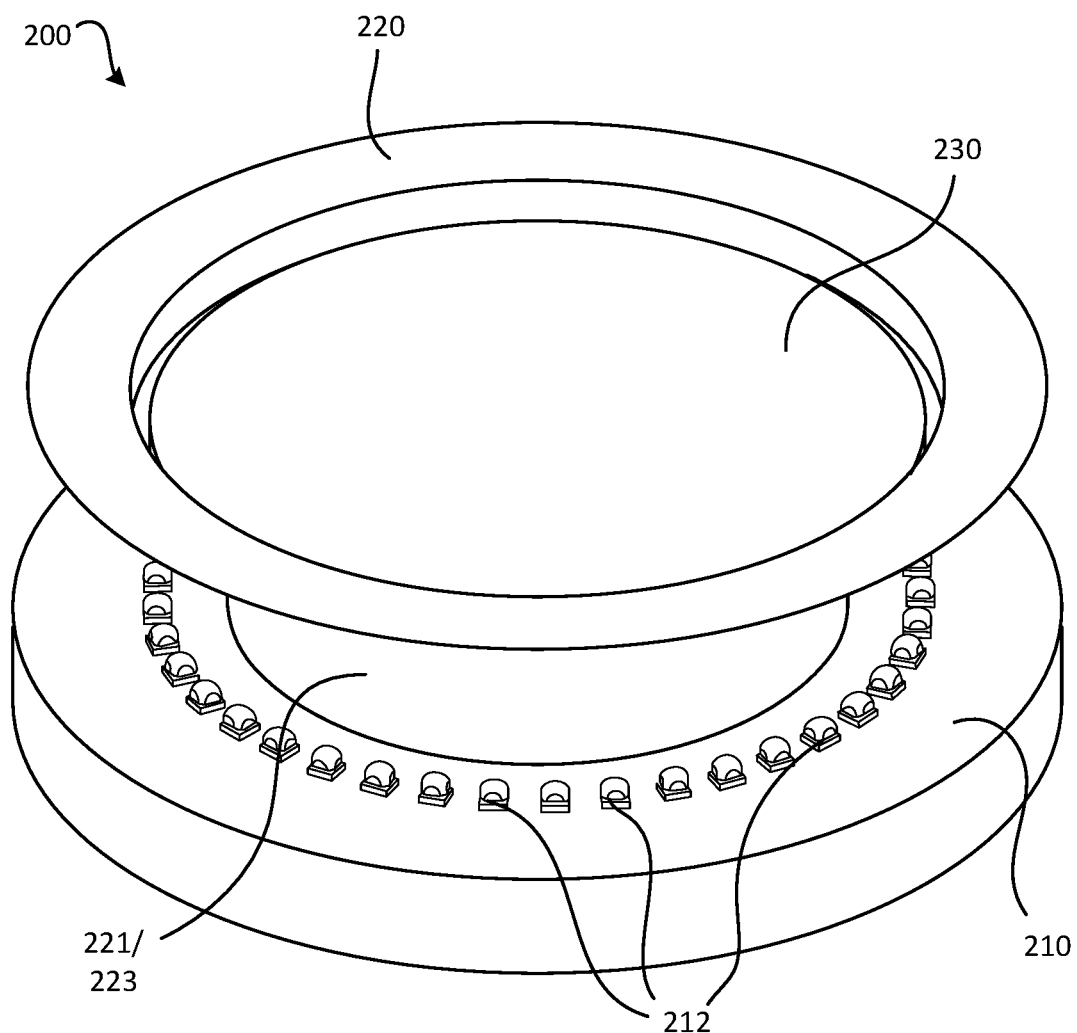
FIG. 2 illustrates a perspective view of an anti-collision light assembly, in accordance with various embodiments.

In various embodiments, and with reference to FIG. 2, a light assembly 200 is provided. The light assembly 200 may be utilized as one or more of the anti-collision lights 100 described above. That is, base 210 of the light assembly 200 may be mounted or otherwise affixed to a portion of the aircraft 101. The light assembly 200 generally includes base 210, an annular reflector 220, and a retainer 230, according to various embodiments. The base 210, as described in greater detail below, generally includes one or more light sources 212 mounted thereto, according to various embodiments. Emitted light 203 (FIG. 4) from the plurality of light sources 212 is reflected off a reflective surface 213 (FIG. 4) of the annular reflector 220 to provide an emitted light pattern (e.g., illumination field of view 103a shown in FIG. 1A). In various embodiments, the annular reflector 220 is held in position via the retainer 230, which is coupled to the base 210. That is, the annular reflector 220 may be compressed between the base 210 and the retainer 230 to hold the annular reflector 220 in place.

Figure 3:
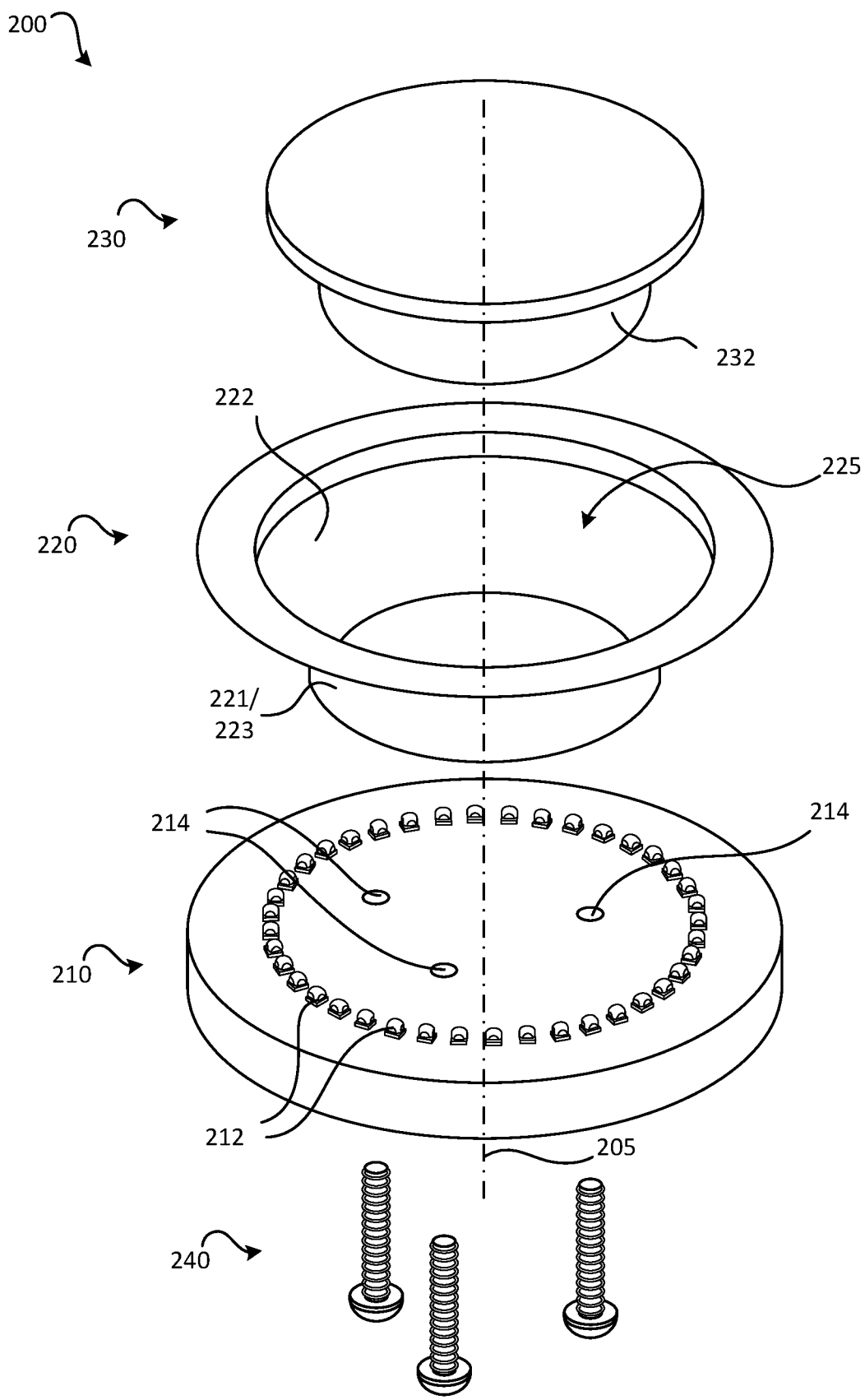
FIG. 3 illustrates an exploded perspective view of an anti-collision light assembly, in accordance with various embodiments.
Figure 4:
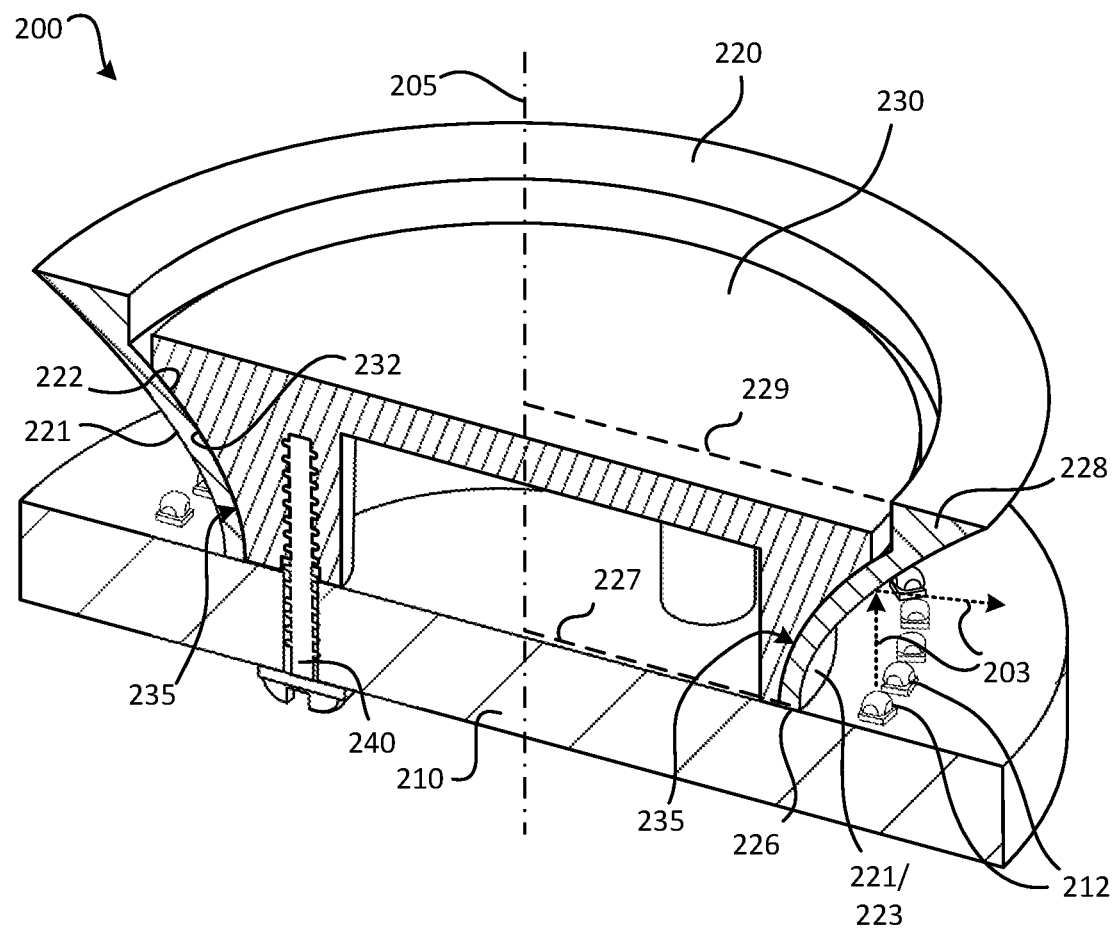
FIG. 4 illustrates a cross-sectional view of an anti-collision light assembly, in accordance with various embodiments.

In various embodiments, and with reference to FIGS. 3 and 4, the light assembly 200 has various benefits over conventional lights, according to various embodiments. For example light assembly 200 may provide a 360° or substantially 360° light pattern using a single set of light sources 212 that are mounted to the single base 210 and circumferentially distributed around the single annular reflector 220. Thus, the light assembly 200 may be implemented with reduced materials, less cost, and/or less weight than conventional assemblies, which may also result in various performance and durability advantages.

Further, because the annular reflector 220 and the retainer 230 are separate components, various manufacturing and design benefits may be realized. For example, instead of sacrificing quality and/or reflectivity of a reflector in order to provide sufficient structural mounting integrity, the optical performance of the annular reflector 220 can be tuned independently of the need for structural suitableness because the separate retainer 230 component provides the requisite mounting structure, according to various embodiments. Said differently, a conventional reflector may include reinforcing ribs or other structural features through which fasteners may be inserted to mount the reflector, and these structural features may adversely affect the optical performance of the conventional reflector (e.g., may introduce optical distortions). However, in the disclosed light assembly 200, fasteners 240 may be utilized to couple the retainer 230 directly to the base 210, with the annular reflector 220 being wedged therebetween. Additional details pertaining to the features of the light assembly 200 and the associated benefits/advantages are provided below.

In various embodiments, and with continued reference to FIGS. 3 and 4, the annular reflector 220 defines a central bore 225, and a central longitudinal axis 205 extends centrally through the central bore 225. The annular reflector 220 may have a first radially outward surface 221 and a first radially inward surface 222. As used herein, the terms "radially outward" and "radially inward" refer generally to positions of surfaces/components along a radial direction relative to the central longitudinal axis 205. That is, the first radially outward surface 221 of the annular reflector 220 generally faces away from the central longitudinal axis 205 and the first radially inward surface 222 generally faces toward the central longitudinal axis 205. The first radially outward surface 221 of the annular reflector 220 comprises a reflective surface 223.

In various embodiments, the retainer 230 comprises a second radially outward surface 232 that seats against the first radially inward surface 222 of the annular reflector 220 in an assembled/installed configuration. This engagement between the second radially outward surface 232 of the retainer 230 and the first radially inward surface 222 of the annular reflector holds and retains the annular reflector 220 in a desired position relative to the light sources 212 mounted to the base 210, according to various embodiments. Said differently, a seated interface 235 (FIG. 4), which may also be referred to herein as a joining interface or an engagement interface, is defined as a region of direct contact between the second radially outward surface 232 of the retainer 230 and the first radially inward surface 222 of the annular reflector 220. Thus, according to various embodiments, the second radially outward surface 232 of the retainer 230 and the first radially inward surface 222 of the annular reflector 220 have the same or substantially the same profile, and are thus configured to be in contouring/complementing engagement with each other. The complementary geometries of these surfaces 232, 222 may allow the retainer 230 to provide a uniform retention force to the annular reflector 220, thereby uniformly compressing the annular reflector 220 between the seated interface 235 and the base 210 to securely hold the annular reflector 220 in position relative to the base 210. This uniform retention force transmitted from the retainer 230 to the annular reflector 220 along the seated interface 235 promotes and facilitates the accurate and precise emanation of light 203 from the light sources 212 and off of the reflective surface 223 of the annular reflector 220, according to various embodiments.

In various embodiments, the first radially outward surface 221 (e.g., the reflective surface 223) also has the same profile as the seated interface 235. Thus, a wall thickness of the annular reflector 220 between the seated interface 235 and the reflective surface 223 may be constant. The constant wall thickness of this region of the annular reflector 220 may improve the ability of the reflective surface 223 of the annular reflector 220 to accurately and precisely reflect the light 203. Said differently, optical distortions may be minimized or substantially minimized because of the uniform/constant wall thickness of the annular reflector 220 between the seated interface 235 and the reflective surface 223 portion of the annular reflector 220. In various embodiments, the annular reflector 220 is exclusively retained to the base 210 via the seated interface 235. That is, the light assembly 200 may not include fasteners or other mounting features that extend directly between the base 210 and the annular reflector 220, but instead the retainer 230 may receive the fasteners 240 which extend to/through the base 210 for holding the assembly together.

In various embodiments, and with specific reference to FIG. 4, the annular reflector comprises a first end rim 226 that is disposed toward (i.e., faces) the base 210 and a second end rim 228 that extends away from the base 210. In order for the retainer 230 to compress the annular reflector 220 against the base 210, the annular reflector 220 and thus the retainer 230 may have the conical, tapering shape shown in the figures. That is, the first end rim 226 may have a first radius 227 and the second end rim 228 may have a second radius 229, with the second radius 229 being larger than the first radius 227. In various embodiments, the reflective surface 223 of the annular reflector 220 extending from the first end rim 226 to the second end rim 228 is concave. In various embodiments, the reflective surface 223 is parabolic. Said differently, an axis of symmetry of the parabolic reflective surface 223 is perpendicular to the central longitudinal axis 205. This axis of symmetry may extend along the surface of the base 210 (or may at least be substantially parallel to the surface of the base 210). For example, the reflective surface 223 may be a paraboloid with the plurality of light sources 212 being disposed generally at the focus of the paraboloid. In various embodiments, the curved profile of the reflective surface 223 may be defined by a hyperbolic, parabolic, or complex polynomial equation, among others.

In various embodiments, the light sources 212 are mounted or otherwise coupled to the base 210. The base 210 may be a substrate that includes electronic circuitry (e.g., a printed circuit board), and the light sources 212 may be operably coupled to this electronic circuitry. In various embodiments, the light sources are light emitting diodes ("LEDs"). In various embodiments, the one or more light sources 212 are disposed/coupled to the base 210 in specified orientations configured to facilitate a desired illumination field of view. For example, the plurality of light sources 212 may be disposed on the base 210 in a closed curve configuration. That is, the plurality of light sources 212 may be positioned adjacent each other to have a specific shape across the surface of the base 210. The shape may be a circle, an oval, an ellipse, a polygon (e.g., triangle, square, rectangle), and the like. In various embodiments, the light sources 212 are symmetrically distributed about the central longitudinal axis 205. That is, the light sources 212 may be arranged around the first end rim 226 of the annular reflector 220. In various embodiments, the arrangement of light sensors is concentric with the annular reflector 220 and the retainer 230. In various embodiments, the second end rim 228 of the annular reflector 220 extends so as to be disposed above the light sources 212.

In various embodiments, the annular reflector 220 is manufactured via an injection molding process. The annular reflector 220 may also be made using one or more additive or subtractive manufacturing processes. In various embodiments, the annular reflector 220 is made from a plastic material with a mirrored surface. Because the annular reflector 220 and the retainer 230 are separate components, the design/configuration of each may be separately optimized (e.g., may be iteratively designed/refined) without necessarily affecting the other. Said differently, the cavities, rigidity, or other features of the retainer 230 may be altered and changed without adversely affecting the optical performance of the annular reflector 220, according to various embodiments.

Figure 5:
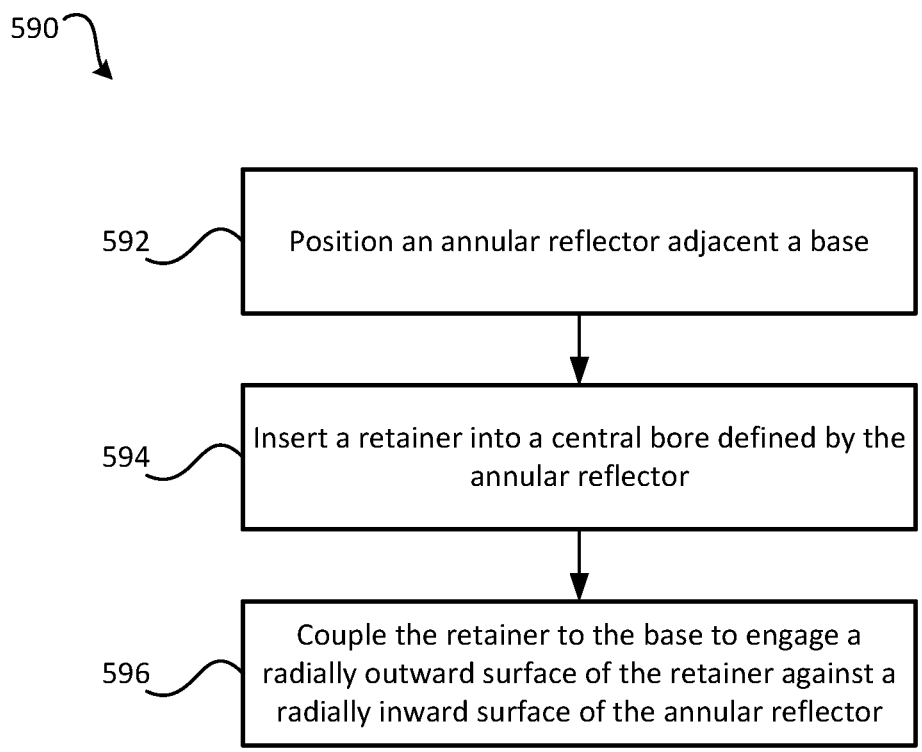
FIG. 5 is a schematic flowchart diagram of a method of assembling an anti-collision light assembly, in accordance with various embodiments.

In various embodiments, and with reference to FIG. 5, a method 590 of assembling a light assembly is provided. The method 590 may include positioning an annular reflector adjacent a base at step 592. The method 590 may also include inserting a retainer into a central bore defined by the annular reflector at step 594. Further, the method 590 may include coupling the retainer to the base such that a radially outward surface of the retainer engages a radially inward surface of the annular reflector at step 596. Step 596 may retain the annular reflector in a desired position relative to the plurality of light sources.

In various embodiments, the radially outward surface of the retainer and the radially inward surface of the annular reflector have a same profile. In such embodiments, in response to coupling the retainer to the base, a seated interface of the light assembly is defined as a region of direct contact between the radially outward surface of the retainer and the radially inward surface of the annular reflector. In various embodiments, a wall thickness of the annular reflector along the seated interface is constant.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A light assembly comprising:
   a base comprising a light source mounted thereto;
   an annular reflector comprising a first radially outward surface and a first radially inward surface, the annular reflector defining a central longitudinal axis and the first radially outward surface comprising a reflective surface; and
   a retainer coupled to the base, the retainer comprising a second radially outward surface;
   wherein the second radially outward surface of the retainer seats against the first radially inward surface of the annular reflector to retain the annular reflector in a desired position relative to the light source mounted to the base;
   wherein a seated interface of the light assembly is defined as a region of direct contact between the second radially outward surface of the retainer and the first radially inward surface of the annular reflector; and
   wherein the reflective surface of the annular reflector and the seated interface have a same profile.

2. The light assembly of claim 1, wherein:
   the annular reflector comprises a first end rim disposed toward the base and a second end rim extending away from the base;
   the first end rim comprises a first radius and the second end rim comprises a second radius; and
   the second radius is larger than the first radius.

3. The light assembly of claim 1, wherein a wall thickness of the annular reflector between the seated interface and the reflective surface is constant.

4. The light assembly of claim 1, wherein in response to coupling the retainer to the base, the annular reflector is compressed between the second radially outward surface of the retainer and the base.

5. The light assembly of claim 1, wherein the annular reflector is exclusively retained to the base via the seated interface between the annular reflector and the retainer.

6. The light assembly of claim 1, wherein the light source is a first light source of a plurality of light sources, wherein the plurality of lights sources are circumferentially distributed around the annular reflector.

7. The light assembly of claim 1, wherein the reflective surface of the annular reflector is concave from the first end rim to the second end rim.

8. The light assembly of claim 1, wherein the reflective surface of the annular reflector is parabolic from the first end rim to the second end rim.

9. The light assembly of claim 8, wherein an axis of symmetry of the reflective surface is perpendicular to the central longitudinal axis of the annular reflector.

10. An anti-collision light assembly of an aircraft, the anti-collision light assembly comprising:
a base comprising a plurality of light sources mounted thereto;
an annular reflector comprising a first radially outward surface and a first radially inward surface, the annular reflector defining a central longitudinal axis and the first radially outward surface comprising a reflective surface; and
a retainer coupled to the base, the retainer comprising a second radially outward surface;
wherein the second radially outward surface of the retainer seats against the first radially inward surface of the annular reflector to retain the annular reflector in a desired position relative to the plurality of light sources mounted to the base;
wherein a seated interface of the light assembly is defined as a region of direct contact between the second radially outward surface of the retainer and the first radially inward surface of the annular reflector;
wherein a wall thickness of the annular reflector between the seated interface and the reflective surface is constant; and
wherein the reflective surface of the annular reflector and the seated interface have a same profile.

11. The anti-collision light assembly of claim 10, wherein:
the annular reflector comprises a first end rim engaged against the base and a second end rim extending away from the base;
the first end rim comprises a first radius and the second end rim comprises a second radius; and
the second radius is larger than the first radius.

12. The anti-collision light assembly of claim 10, wherein:
in response to coupling the retainer to the base, the annular reflector is compressed between the second radially outward surface of the retainer and the base; and
the annular reflector is exclusively retained to the base via the seated interface between the annular reflector and the retainer.

13. The anti-collision light assembly of claim 11, wherein the reflective surface of the annular reflector is parabolic from the first end rim to the second end rim.

14. The anti-collision light assembly of claim 12, wherein an axis of symmetry of the parabolic reflective surface is perpendicular to the central longitudinal axis of the annular reflector.

15. A method of assembling a light assembly, the method comprising:
positioning an annular reflector adjacent a base, wherein the base comprises a plurality of light sources;
inserting a retainer into a central bore defined by the annular reflector; and
coupling the retainer to the base such that a radially outward surface of the retainer engages a radially inward surface of the annular reflector to retain the annular reflector in a desired position relative to the plurality of light sources;
wherein the radially outward surface of the retainer and the radially inward surface of the annular reflector have a same profile, wherein in response to coupling the retainer to the base, a seated interface of the light assembly is defined as a region of direct contact between the radially outward surface of the retainer and the radially inward surface of the annular reflector.

16. The method of claim 15, wherein a wall thickness of the annular reflector along the seated interface is constant.

* * * * *